US010315949B2

(12) United States Patent
Gross et al.

(10) Patent No.: US 10,315,949 B2
(45) Date of Patent: Jun. 11, 2019

(54) FAST ION-EXCHANGEABLE BORON-FREE GLASSES WITH LOW SOFTENING POINT

(71) Applicant: CORNING INCORPORATED, Corning, NY (US)

(72) Inventors: Timothy Michael Gross, Corning, NY (US); John Christopher Mauro, Corning, NY (US); Yihong Mauro, Corning, NY (US); Rohit Rai, Painted Post, NY (US); Adama Tandia, Nelson, PA (US); Zhongzhi Tang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/040,502

(22) Filed: Feb. 10, 2016

(65) Prior Publication Data

US 2016/0251255 A1    Sep. 1, 2016

Related U.S. Application Data (60) Provisional application No. 62/121,018, filed on Feb. 26, 2015.

(51) Int. Cl.
| | | |
|---|---|---|
| *C03C 3/097* | (2006.01) | |
| *C03C 21/00* | (2006.01) | |
| *B32B 17/06* | (2006.01) | |

(52) U.S. Cl.
CPC ............. *C03C 3/097* (2013.01); *B32B 17/06* (2013.01); *C03C 21/002* (2013.01)

(58) Field of Classification Search
None
See application file for complete search history.

(56) References Cited

U.S. PATENT DOCUMENTS 3,630,704 A * 12/1971 Garfinkel .............. C03C 21/002
65/114
4,055,703 A    10/1977 Rinehart
(Continued)

FOREIGN PATENT DOCUMENTS

| WO | 2007013538 | 2/2007 |
| WO | 2011149811 | 12/2011 |

OTHER PUBLICATIONS

Smedskjaer et al; , "Impact of ZnO on the Structure and Properties of Sodium Aluminosilicate Glasses: Comparison with Alkaline Earth Oxides," Journal of Non-Crystalline Solids 381, 58-64 (2013).
(Continued)

*Primary Examiner* — David Sample
(74) *Attorney, Agent, or Firm* — Kevin M. Johnson (57) ABSTRACT

Alkali aluminosilicate glasses that exhibit fast ion exchange performance and having low softening points that enable the glasses to be formed into non-planar, three-dimensional shapes. The glasses contain less than about 1 mol % of boron oxide and, in some embodiments, are substantially free of $B_2O_3$. Furthermore, these glasses have excess amounts of alkali oxides relative to both $Al_2O_3$ and $P_2O_5$, in order to improve melting behavior and ion exchange performance while still achieving sufficiently low softening points to allow for formability.

36 Claims, 2 Drawing Sheets

(56) References Cited

U.S. PATENT DOCUMENTS

| | | |
|---|---|---|
| 8,666,705 B2 | 3/2014 | Allan et al. |
| 8,720,226 B2 | 5/2014 | Allan et al. |
| 2008/0020919 A1* | 1/2008 | Murata .................. C03C 3/087 501/66 |
| 2010/0009154 A1* | 1/2010 | Allan .................... C03C 3/085 428/220 |
| 2010/0035745 A1* | 2/2010 | Murata .................. C03C 3/083 501/66 |
| 2011/0014475 A1* | 1/2011 | Murata ................ C03B 17/064 428/410 |
| 2011/0294648 A1* | 12/2011 | Chapman .............. C03C 3/097 501/63 |
| 2012/0013522 A1 | 1/2012 | Yamaguchi et al. |
| 2012/0196110 A1* | 8/2012 | Murata .................. C03B 25/08 428/220 |
| 2013/0122284 A1* | 5/2013 | Gross ....................... C03C 3/04 428/336 |
| 2013/0224491 A1* | 8/2013 | Smedskjaer ............ C03C 3/085 428/410 |
| 2013/0224492 A1* | 8/2013 | Bookbinder .......... C03C 21/002 428/410 |
| 2014/0170380 A1* | 6/2014 | Murata .................. C03C 3/087 428/141 |
| 2014/0230490 A1 | 8/2014 | Ellison et al. |
| 2015/0166405 A1* | 6/2015 | Murata .................. C03C 3/083 428/410 |
| 2015/0239770 A1 | 8/2015 | Gross |

OTHER PUBLICATIONS

International Search Report and Written Opinion of the International Searching Authority, PCT/US2016/019669; dated May 19, 2016.

* cited by examiner

FIG. 2

FAST ION-EXCHANGEABLE BORON-FREE GLASSES WITH LOW SOFTENING POINT

This application claims the benefit of priority under 35 U.S.C. § 119 of U.S. Provisional Application Ser. No. 62/121,018 filed on Feb. 26, 2015 the content of which is relied upon and incorporated herein by reference in its entirety.

BACKGROUND

The disclosure relates to alkali aluminosilicate glasses that have low softening points. More particularly, the disclosure relates to such glasses that are ion exchangeable and formable into three-dimensional shapes. Even more particularly, the disclosure relates to alkali aluminosilicate glasses having low softening points and containing low amounts or are free of $B_2O_3$.

Ion exchangeable glasses are widely used as cover glass for displays found in many modern electronic devices including hand-held devices. However, the use of these chemically-strengthenable glasses in such applications has been limited to devices that are, for the most part, flat and planar. The formation of three-dimensional (3D) glass shapes is in some instances accomplished by molding or vacuum sagging processes in which the glass is heated and allowed to sag under vacuum into a mold to obtain its final or near-final shape.

Many ion-exchangeable glasses, however, have softening points that are sufficiently high that such glasses tend to react with, stick to, and/or degrade the molds used for the sagging process, even when a protective coating is employed. Boron oxide ($B_2O_3$) is sometimes added to the glass to reduce the viscosity and liquidus temperature of the glass. However, $B_2O_3$ also acts to inhibit the ion exchange performance of the glass, especially when $B_2O_3$ is present in its tetrahedrally coordinated state, which can occur when alkali metal oxides are present in relatively large amounts.

SUMMARY

The present disclosure provides alkali aluminosilicate glasses that exhibit fast ion exchange performance and having low softening points that enable the glasses to be formed into non-planar, three-dimensional shapes. The glasses contain less than about 1 mol % of boron oxide and, in some embodiments, are substantially free of $B_2O_3$. Furthermore, these glasses have excess amounts of alkali oxides relative to both $Al_2O_3$ and $P_2O_5$, in order to improve melting behavior and ion exchange performance while still achieving sufficiently low softening points to allow for formability.

Accordingly, one aspect of the disclosure is to provide an alkali aluminosilicate glass comprising from 0 mol % to about 1 mol % $B_2O_3$ and at least one alkali metal oxide $R_2O$, and having a softening point of about 900° C. or less, wherein $1.3 \leq R_2O(\text{mol \%})/Al_2O_3(\text{mol \%}) \leq 2.2$.

A second aspect of the disclosure is to provide an alkali aluminosilicate glass. The glass is boron-free and comprising: from about 50 mol % to about 70 mol % $SiO_2$; from about 10 mol % to about 15 mol % $Al_2O_3$; from 0 mol % to about 1 mol % $B_2O_3$; from 0 mol % to about 5 mol % $P_2O_5$; from about 18 mol % to about 22 mol % $Na_2O$; from 0 mol % to about 3 mol % $K_2O$; from 0 mol % to about 4 mol % MgO; from 0 mol % to about 1 mol % CaO; and from 0 mol % to about 8 mol % ZnO, wherein $1.3 \leq (Na_2O(\text{mol \%})+K_2O(\text{mol \%}))/Al_2O_3(\text{mol \%}) \leq 2.0$, wherein the glass has a softening point of about 900° C. or less.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %). Coefficients of thermal expansion (CTE) for glasses are expressed in terms of $10^{-7}/°$ C. and represent a value measured over a temperature range from about 20° C. to about 300° C., unless otherwise specified. High temperature (or liquid) coefficients of thermal expansion (high temperature CTE) are expressed in terms of part per million (ppm) per degree Celsius (ppm/° C.), and represent a value measured in the high temperature plateau region of the instantaneous coefficient of thermal expansion (CTE) vs. temperature curve. The high temperature CTE measures the volume change associated with heating or cooling of the glass through the transformation region.

As used herein, the term "liquidus temperature," or "$T^L$" refers to the temperature at which crystals first appear as a molten glass cools down from the melting temperature, or the temperature at which the very last crystals melt away as temperature is increased from room temperature.

As used herein, the term "zircon breakdown viscosity" refers to the viscosity of the glass at which zircon—which is commonly used as a refractory material in glass processing and manufacture—breaks down in the presence of the glass or glass melt to form zirconia and silica. The glasses described herein have a zircon breakdown temperature that is equal to the temperature at which the viscosity of the glass is equal to the zircon breakdown viscosity.

As used herein, "softening point" refers to the viscosity at which a glass object will sag under its own weight and is defined as the temperature at which the viscosity of the glass is $10^{7.6}$ Poise (P). As used herein, "annealing" means heating a glass to its anneal point for a predetermined time period, typically from about 4 to about 8 hours. "Fictivation point" and "fictive temperature" refer to the temperature at which a glass has a viscosity of $10^{11}$ Poise.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of $B_2O_3$," is one in which $B_2O_3$ is not actively added or batched into the glass, but may be present in very small amounts as a contaminant—e.g., less than 1 mol %, or less than 0.1 mol %.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, or, alternatively, bulk cylinder methods known in the art.

Figure 1:
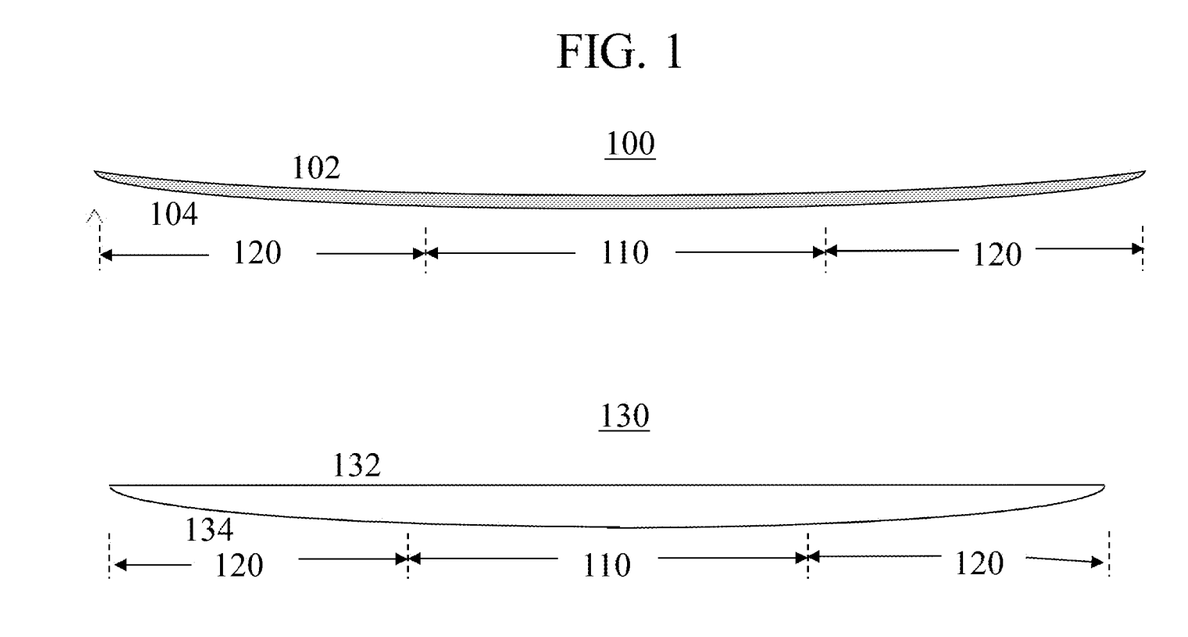
FIG. 1 is a cross-sectional schematic view of dish-shaped glass articles.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein is a family of ion-exchangeable alkali aluminosilicate glasses (referred to hereinafter simply as "glasses" unless otherwise specified) and alkali aluminosilicate glass articles that exhibit fast ion exchange performance (i.e., to achieve deep depth of layer and high compressive stress when ion exchanged), and have low softening points that allow the glass to be formed into non-planar, three-dimensional (3D) shapes. These glasses comprise at least one alkali metal oxide $R_2O$, where $R_2O$ includes $Na_2O$, and optionally, one or more of $Li_2O$, $K_2O$, $Rb_2O$, and $Cs_2O$, wherein $1.3 \leq R_2O(mol\%)/Al_2O_3(mol\%) \leq 2.2$. These glasses also comprise from 0 mol % to about 1 mol % $B_2O_3$ and, in some embodiments, are substantially free of $B_2O_3$. In some embodiments the glasses are free of $B_2O_3$. These glasses are also designed to be fusion drawn and compatible with zircon isopipes that are widely used in the fusion draw process.

The glasses described herein have softening points of less than about 900° C. In some embodiments, the softening point is less than about 860° C. and, in still other embodiments, the softening point is less than about 835° C.

In some embodiments, the glasses described herein comprise or consist essentially of: from about 50 mol % to about 70 mol % $SiO_2$ (i.e., 50 mol % $\leq SiO_2 \leq$ 70 mol %); from about 10 mol % to about 15 mol % $Al_2O_3$ (i.e., 10 mol % $\leq Al_2O_3 \leq$ 15 mol %); from 0 mol % to about 1 mol % $B_2O_3$ (i.e., 0 mol % $\leq B_2O_3 \leq$ 1 mol %); from 0 mol % to about 5 mol % $P_2O_5$ (i.e., 0 mol % $\leq P_2O_5 \leq$ 5 mol %); from about 18 mol % to about 22 mol % $Na_2O$ (i.e., 18 mol % $\leq Na_2O \leq$ 22 mol %); from 0 mol % to about 3 mol % $K_2O$ (i.e., 0 mol % $\leq K_2O \leq$ 4 mol %); from 0 mol % to about 4 mol % MgO (i.e., 0 mol % $\leq$ MgO $\leq$ 4 mol %); from 0 mol % to about 1 mol % CaO (i.e., 0 mol % $\leq$ CaO $\leq$ 1 mol %); and from 0 mol % to about 8 mol % ZnO (i.e., 0 mol % $\leq$ ZnO $\leq$ 8 mol %), wherein $1.3 \leq (Na_2O(mol\%) + K_2O(mol\%))/Al_2O_3(mol\%) \leq 2.0$.

In some embodiments, the glass comprises or consist essentially of: from about 55 mol % to about 66 mol % $SiO_2$ (i.e., 55 mol % $\leq SiO_2 \leq$ 66 mol %); from about 10 mol % to about 14 mol % $Al_2O_3$ (i.e., 10 mol % $\leq Al_2O_3 \leq$ 14 mol %); from 0 mol % to about 0.5 mol % $B_2O_3$ (i.e., 0 mol % $\leq B_2O_3 \leq$ 0.5 mol %); from 0 mol % to about 5 mol % $P_2O_5$ (i.e., 0 mol % $\leq P_2O_5 \leq$ 5 mol %); from about 19 mol % to about 21 mol % $Na_2O$ (i.e., 19 mol % $\leq Na_2O \leq$ 21 mol %); from 0 mol % to about 2 mol % $K_2O$ (i.e., 0 mol % $\leq K_2O \leq$ 2 mol %); from 0 mol % to about 2 mol % MgO (i.e., 0 mol % $\leq$ MgO $\leq$ 2 mol %); from 0 mol % to about 0.5 mol % CaO (i.e., 0 mol % $\leq$ CaO $\leq$ 0.5 mol %); and from about 1 mol % to about 7 mol % ZnO (i.e., 1 mol % $\leq$ ZnO $\leq$ 7 mol %). In some embodiments, 5 mol % $\leq Na_2O(mol\%) + K_2O(mol\%) - Al_2O_3(mol\%) \leq$ 10 mol %, $K_2O(mol\%) \leq 0.5(Na_2O(mol\%) + K_2O(mol\%))$, and/or 56 mol % $\leq SiO_2(mol\%) + B_2O_3(mol\%) \leq$ 75 mol %.

In certain embodiments, the glass comprises or consists essentially of: from about 56 mol % to about 62 mol % $SiO_2$ (i.e., 56 mol % $\leq SiO_2 \leq$ 62 mol %); from about 11 mol % to about 14 mol % $Al_2O_3$ (i.e., 11 mol % $\leq Al_2O_3 \leq$ 14 mol %); from about 1 mol % to about 5 mol % $P_2O_5$ (i.e., 1 mol % $\leq P_2O_5 \leq$ 5 mol %); from about 19 mol % to about 20 mol % $Na_2O$ (i.e., 19 mol % $\leq Na_2O \leq$ 20 mol %); from 0 mol % to about 2 mol % $K_2O$ (i.e., 0 mol % $\leq K_2O \leq$ 2 mol %); from 0 mol % to about 4 mol % MgO (i.e., 0 mol % $\leq$ MgO $\leq$ 4 mol %); from 0 mol % to about 0.2 mol % CaO (i.e., 0 mol % $\leq$ CaO $\leq$ 0.2 mol %); and from about 2 mol % to about 7 mol % ZnO (i.e., 2 mol % $\leq$ ZnO $\leq$ 7 mol %). In some embodiments, 5 mol % $\leq Na_2O(mol\%) + K_2O(mol\%) - Al_2O_3(mol\%) \leq$ 9 mol % and/or $1.4 \leq (Na_2O(mol\%) + K_2O(mol\%))/Al_2O_3(mol\%) \leq 1.8$.

In some embodiments, the glasses described herein are free of at least one of lithium, barium, antimony, arsenic, and oxides or other compounds thereof.

Compositions of non-limiting examples of these glasses are listed in Table 1. These samples were are double-melted in crucibles. Table 2 lists selected physical properties, which were determined using those means routinely used by those skilled in the art, of the glasses listed in Table 1. The properties listed in Table 2 include anneal, strain, and softening points, density, low (glass) and high temperature coefficients of thermal expansion, Poisson's ratio, shear modulus, Young's modulus, liquidus temperature, fictivation temperature, and refractive index.

TABLE 1

Compositions of examples of alkali aluminosilicate glasses described herein, expressed in mol %.

| | Sample | | | | | |
|---|---|---|---|---|---|---|
| | 1 | 2 | 3 | 4 | 5 | 6 |
| $SiO_2$ | 56.71 | 58.07 | 57.90 | 61.17 | 57.30 | 59.38 |
| $Al_2O_3$ | 13.05 | 12.76 | 12.98 | 12.77 | 13.67 | 11.38 |
| $B_2O_3$ | 0.00 | 0.00 | 0.00 | 0.00 | 0.00 | 0.00 |
| $Na_2O$ | 19.76 | 19.67 | 19.54 | 19.08 | 19.09 | 19.68 |
| $K_2O$ | 0.04 | 0.36 | 1.01 | 0.03 | 0.04 | 1.21 |
| $Li_2O$ | 0.00 | 0.00 | 0.00 | 0.00 | 0.00 | 0.00 |
| MgO | 0.02 | 0.02 | 0.02 | 0.80 | 0.02 | 0.02 |
| CaO | 0.03 | 0.03 | 0.03 | 0.03 | 0.03 | 0.03 |
| ZnO | 6.81 | 5.43 | 4.28 | 2.52 | 5.43 | 5.81 |
| $SnO_2$ | 0.09 | 0.09 | 0.09 | 0.09 | 0.09 | 0.09 |
| $Fe_2O_3$ | 0.01 | 0.01 | 0.01 | 0.01 | 0.01 | 0.01 |
| $P_2O_5$ | 3.49 | 3.56 | 4.15 | 3.50 | 4.33 | 2.40 |

| | Sample | | | | | |
|---|---|---|---|---|---|---|
| | 7 | 8 | 9 | 10 | 11 | 12 |
| $SiO_2$ | 58.97 | 58.88 | 58.41 | 65.21 | 65.24 | 65.52 |
| $Al_2O_3$ | 11.84 | 11.96 | 12.08 | 11.01 | 11.11 | 11.10 |
| $B_2O_3$ | 0.00 | 0.00 | 0.00 | 0.00 | 0.00 | 0.00 |
| $Na_2O$ | 19.60 | 19.70 | 19.70 | 19.41 | 19.24 | 19.16 |
| $K_2O$ | 0.38 | 0.84 | 1.47 | 0.26 | 0.66 | 0.52 |
| $Li_2O$ | 0.00 | 0.00 | 0.00 | 0.00 | 0.00 | 0.00 |
| MgO | 0.02 | 0.02 | 0.02 | 0.02 | 0.01 | 0.02 |
| CaO | 0.03 | 0.03 | 0.03 | 0.03 | 0.03 | 0.03 |
| ZnO | 6.67 | 5.66 | 4.57 | 2.32 | 1.52 | 1.74 |
| $SnO_2$ | 0.10 | 0.09 | 0.10 | 0.10 | 0.09 | 0.09 |
| $Fe_2O_3$ | 0.01 | 0.01 | 0.01 | 0.01 | 0.01 | 0.01 |
| $P_2O_5$ | 2.38 | 2.81 | 3.61 | 1.64 | 2.07 | 1.82 |

TABLE 2

Selected physical properties of the glasses listed in Table 1.

| | Sample | | | | | |
|---|---|---|---|---|---|---|
| | 1 | 2 | 3 | 4 | 5 | 6 |
| Anneal Pt. (° C.) via Fiber Elongation | 609 | 604 | 606 | 624 | 631 | 583 |
| Strain Pt. (° C.) via Fiber Elongation: | 567 | 561 | 565 | 581 | 593 | 537 |
| Softening Pt. (° C.) via Fiber Elongation | | | | | 864.5 | 791.8 |
| Density (g/cm$^3$) | 2.564 | 2.536 | 2.514 | 2.475 | 2.529 | 2.559 |
| Glass CTE (×10$^{-7}$/° C.) | 96.1 | 97.9 | 102.4 | 94.4 | 94.8 | 101.8 |
| Liquid CTE (ppm/° C.): | 21.99 | 23.55 | 20.17 | 21.11 | 20.70 | 24.57 |
| Poisson's Ratio | 0.221 | 0.216 | 0.218 | 0.21 | 0.22 | 0.222 |
| Shear Modulus (Mpsi) | 4.08 | 4.09 | 4.06 | 4.03 | 4 | 4.08 |
| Young's Modulus (Mpsi) | 9.97 | 9.95 | 9.89 | 9.76 | 9.75 | 9.97 |
| 72-hr Int. Liquidus Temp. (° C.) | 950 | 930 | 900 | 965 | 925 | 945 |
| Fictivation Temp. (° C.) | 716 | 713 | 724 | 737 | 747 | 665 |
| Refractive Index | 1.510 | 1.506 | 1.502 | 1.499 | 1.504 | 1.511 |

TABLE 2-continued

Selected physical properties of the glasses listed in Table 1.

| | Sample | | | | | |
|---|---|---|---|---|---|---|
| | 7 | 8 | 9 | 10 | 11 | 12 |
| Anneal Pt. (° C.) via Fiber Elongation | 599 | 590 | 590 | 579 | 573 | 576 |
| Strain Pt. (° C.) via Fiber Elongation: | 554 | 545 | 548 | 531 | 525 | 529 |
| Softening Pt. (° C.) via Fiber Elongation | 814.6 | 805.3 | 877.2 | 800.4 | 803.3 | 804.1 |
| Density (g/cm$^3$) | 2.567 | 2.553 | 2.526 | 2.483 | 2.467 | 2.468 |
| Glass CTE (×10$^{-7}$/° C.) | 97 | 100.1 | 105.1 | 93.8 | 95.4 | 94.9 |
| Liquid CTE (ppm/° C.): | 23.63 | 21.88 | 22.28 | 22.62 | 23.41 | 23.86 |
| Poisson's Ratio | 0.218 | 0.221 | 0.224 | 0.223 | 0.212 | 0.222 |
| Shear Modulus (Mpsi) | 4.1 | 4.09 | 4.09 | 4.04 | 4.06 | 4.02 |
| Young's Modulus (Mpsi) | 9.99 | 9.98 | 10.01 | 9.89 | 9.84 | 9.83 |
| 72-hr Int. Liquidus Temp. (° C.) | 970 | 950 | 890 | 930 | 940 | 940 |
| Fictivation Temp. (° C.) | 684 | 684 | 700 | 665 | 666 | 667 |
| Refractive Index | 1.512 | 1.509 | 1.505 | 1.503 | 1.500 | 1.501 |

Regarding the specific examples of glass compositions listed in Tables 1 and 2 above, each oxide component serves an important purpose. Silica $SiO_2$) is the primary glass forming oxide and constitutes the network backbone for the glass. However, owing to its extremely high melting temperature, pure $SiO_2$ is incompatible with most manufacturing processes. Since the viscosity of pure $SiO_2$ or high-content $SiO_2$ glasses is too high in the melting region, defects such as fining bubbles may appear, and erosion of refractories and degradation of platinum processing hardware may become too extreme to permit long-term manufacturing in a continuous process. Furthermore, as silica concentration increases, the liquidus temperature may increase due to increasing stability of cristobalite: a crystalline polymorph of $SiO_2$ that is an undesirable devitrification phase in a continuous process. Also, pure $SiO_2$ alone cannot be chemically strengthened via the ion exchange process. However, a minimum level of $SiO_2$ is required to ensure good chemical durability and compatibility with refractory materials that are widely used in manufacturing. Accordingly, the glasses described herein comprise from about 50 mol % to about 70 mol % $SiO_2$. In some embodiments, the glasses comprise from about 55 mol % to about 66 mol % $SiO_2$ and, in still other embodiments, from about 56 mol % to about 62 mol % $SiO_2$.

Aluminum oxide or alumina ($Al_2O_3$) also serves as a glass former in the example glasses. Due to its tetrahedral coordination, alumina, like $SiO_2$, provides rigidity to the glass network. When carefully balanced against $SiO_2$ concentration and the concentrations of alkali and/or alkaline earth oxides, alumina can be used to reduce liquidus temperature, thus promoting compatibility with the fusion draw process. Like $SiO_2$, an increase in $Al_2O_3$ relative to the alkalis or alkaline earths generally results in decreased density, decreased coefficient of thermal expansion, and improved durability. $Al_2O_3$ enables a strong network backbone while allowing for the fast diffusivity of alkali ions and therefore plays an important role in ion-exchangeable glasses. Thus, the presence of $Al_2O_3$ hastens the kinetics of the ion-exchange process while promoting a high compressive stress in the ion exchanged glass. When the $Al_2O_3$ concentration is too high, however, it promotes dissolution of zircon refractory material, which can lead to fusion line zirconia defects. Also, high levels of $Al_2O_3$ can lead to a softening point that is unfavorably high for forming 3D shapes. in order to achieve balance among these various properties, the glasses described herein comprise from about 10 mol % to about 15 mol % $Al_2O_3$. In some embodiments, the glasses comprise from about 10 mol % to about 14 mol % $Al_2O_3$, or from about 11 mol % to about 14 mol % $Al_2O_3$.

Boron oxide ($B_2O_3$) is also a glass-forming oxide, and is used to reduce viscosity and the liquidus temperature of the glass. Depending on the details of the glass composition and the viscosity in question, an increase of 1 mol % in the amount of $B_2O_3$ in the glass generally decreases the temperature at equivalent viscosity by 10-14° C. $B_2O_3$ can also lower liquidus temperature by 18-22° C. per mol %, and thus has the effect of decreasing liquidus temperature more rapidly than it decreases viscosity, thereby increasing liquidus viscosity of the glass. When present in its tetrahedrally coordinated state, however, $B_2O_3$ acts to inhibit ion exchange performance, especially with high excess concentrations of alkali oxides in the glass. In the glasses described herein, the concentration of $B_2O_3$ is minimized to less than 1 mol %, or, in some embodiments, less than 0.5 mol %. In certain embodiments, the glass is substantially free (i.e., contains less than 0.1 mol %, or 0 mol %) of $B_2O_3$.

Phosphorus pentoxide ($P_2O_5$) is also a glass-forming oxide, and is used to accelerate ion exchange kinetics and improve compatibility with zircon refractory materials. The presence of $P_2O_5$ provides a strong glass network while promoting alkali ion mobility, thus accelerating the ion exchange kinetics. $P_2O_5$ is a key component for achieving a desired ion exchange depth of layer (DOL) within a short time period. Moreover, $P_2O_5$ acts to suppress the zircon breakdown reaction, which can lead to fusion line zirconia defects. If the concentration of $P_2O_5$ is too high, however, it may become difficult to melt the glass while retaining sufficiently high quality (i.e., low concentrations of bubbles, inclusions, and the like). The glasses described herein comprise from 0 mol % to about 5 mol % $P_2O_5$ and, in some embodiments, from about 1 mol % to about 5 mol % $P_2O_5$.

Alkali oxides ($Na_2O$ and $K_2O$) are also effective at reducing the melting temperature and liquidus temperature of the glass. For ion-exchangeable glasses, the presence of a small alkali oxide (such as $Na_2O$) is necessary to exchange with a larger alkali ion (e.g., $K^+$) when immersed in a molten salt bath. Because the compressive stress achieved through ion exchange is proportional to the number of alkali ions that are exchanged out of the glass, the $Na_2O$ concentration must be sufficiently high to produce a large compressive stress in the glass. The presence of a small amount of $K_2O$ generally improves diffusivity, leading to faster ion exchange kinetics. However, $K_2O$ has a negative impact on zircon breakdown temperature; the zircon breakdown temperature decreases by nearly 45° C. for every mole percent of $K_2O$ added to the glass. For this reason, the $K_2O$ concentration should be kept low (i.e., less than about 3 mol % and, in some embodiments, less than about 2 mol %). $Na_2O$ also has a negative impact on zircon breakdown performance, producing a loss of about 34.5° C. in the breakdown temperature per 1 mol % of $Na_2O$ added to the glass. However, it is necessary to maintain a high enough concentration of $Na_2O$ to ensure good melting behavior, good ion-exchange performance, and low softening point. Accordingly, the glasses described herein contain from about 18 mol % to about 22 mol % $Na_2O$. In some embodiments, these glasses comprise from about 19 mol % to about 21 mol % $Na_2O$ and, in certain embodiments, from about 19 mol % to about 20 mol % $Na_2O$.

Alkali oxides ($Na_2O+K_2O$) in excess of the concentration of $Al_2O_3$ act to promote the formation on non-bridging oxygen (NBO) sites in the glass network. This is useful for achieving low softening points and thus improving compatibility of the glass with 3D forming techniques. The excess alkali ions also contribute to the ion exchange performance of the glass, since the compressive stress of the glass is proportional to the total number of alkali ions exchanged. Accordingly, the glasses disclosed herein, in some embodiments, satisfy the expression 5 mol %≤$Na_2O$ (mol %)+$K_2O$ (mol %)−$Al_2O_3$(mol %)≤12 mol %. In other embodiments, 5 mol %≤$Na_2O$(mol %)+$K_2O$(mol %)−$Al_2O_3$(mol %)≤10 mol %, and in still other embodiments, 5 mol %≤$Na_2O$(mol %)+$K_2O$(mol %)−$Al_2O_3$(mol %)≤9 mol %. In addition, these glasses satisfy the expression 1.3≤($Na_2O$(mol %)+$K_2O$(mol %))/($Al_2O_3$(mol %))≤2.2. In some embodiments, 1.3≤($Na_2O$(mol %)+$K_2O$(mol %))/($Al_2O_3$(mol %))≤2.0, and, in other embodiments, 1.4≤($Na_2O$(mol %)+$K_2O$(mol %))/($Al_2O_3$(mol %))≤1.8.

Divalent oxides, including alkaline earth oxides (MgO, CaO) and zinc oxide (ZnO), also improve the melting behavior of the glass and contribute positively to the compressive stress of the ion exchange-strengthened glass. However, the larger alkaline earth oxides such as CaO also decrease alkali mobility. The CaO concentration should therefore be kept to a minimum; i.e., less than about 1 mol % or, in some embodiments, less than about 0.5 mol %, or less than about 0.2 mol %. In contrast to CaO, both MgO and ZnO act to increase compressive stress with less impact on ion mobility. While both MgO and ZnO adopt similar structural roles in silicate glasses, the lower field strength of the $Zn^{2+}$ cation compared to the $Mg^{2+}$ cation leads to a lower softening point of ZnO—containing glasses compared to equivalent MgO-containing glasses. The presence of ZnO also offers the advantage of reducing photo-darkening of the glass after exposure to ultraviolet radiation. ZnO is therefore the preferred choice of divalent oxide to be included in the glasses described herein. These glasses comprise less than about 4 mol % MgO, in some embodiments, less than about 2 mol % MgO, and, in still other embodiments, less than about 1 mol % MgO. The glasses described herein comprise from 0 mol % to about 8 mol % ZnO, in some embodiments, from about 1 and 7 mol % ZnO, and in other embodiments, from about 2 mol % to 7 mol % ZnO. The total concentration of divalent oxides (Σ[RO]) in this invention is greater than 0 ml % and up to about and 8 mol % and, in some embodiments, from about 1 mol % to about 7 mol %, and, in still other embodiments, from about 3 mol % to about 7 mol %.

$SnO_2$ may be included in the glass as a fining agent. Greater amounts of $SnO_2$ generally equate to improved fining capacity. Because $SnO_2$ is a comparatively expensive raw material, however, it is desirable to add no more $SnO_2$ than is needed to drive gaseous inclusions to an appropriately low level. The glasses described herein comprise from 0 mol % to about 0.5 mol % $SnO_2$. Alternatively, $As_2O_3$ or $Sb_2O_3$ may be used as a fining agent. However these oxides have the disadvantage of being toxic. Other fining agents such as $CeO_2$ may also be used. $CeO_2$ is an especially effective fining agent at low temperatures; however, it can impart a brownish color to the glass.

A small amount of $ZrO_2$ (≤0.5 mol %) may also be present in these glasses and at such a low level does not appreciably affect the melting or fining behavior nor the properties of the glass. Because zirconia will be introduced by contact of hot glass with zirconia-based refractory materials in a melter, $ZrO_2$ is sometimes included in laboratory-scale batches, as the rate of tank wear over time can be determined by monitoring the $ZrO_2$ level in the glass. A small amount of $Fe_2O_3$ (≤0.5 mol %) may also be present in these glasses as an impurity from the raw batch materials. $Fe_2O_3$ may act as a fining agent, but also imparts color to the glass.

The glasses described herein may be formed into a three-dimensional shape using those means known in the art, including vacuum sagging, molding, or the like. Non-limiting examples of such three-dimensional shapes include those articles in which at least one surface has a dish-shaped, curved, convex, or concave profile. Dish-shaped articles may have a substantially flat portion bounded on at least one side by a curved portion. Non-limiting examples of dish-shaped glass articles are schematically shown in cross-sectional views in FIG. 1. Dish-shaped article 100 has two major surfaces 102, 104 each of which has a substantially flat or planar portion 110, bounded on either end (or, alternatively, on both ends) by a curved portion 120 to provide a dish-shaped profile or appearance. In other embodiments, dish-shaped article 130 has only one major surface 134 having a substantially flat or planar portion 110, bounded on either end (or, alternatively, on both ends) by a curved portion 120. The remaining major surface 132 is substantially flat or planar.

Ion exchange is widely used to chemically strengthen glasses. In one particular example, alkali cations within a source of such cations (e.g., a molten salt, or "ion exchange" bath) are exchanged with smaller alkali cations within the glass to achieve a layer that is under a compressive stress (CS) near the surface of the glass. The compressive layer extends from the surface to a depth of layer (DOL) within the glass. In the glasses described herein, for example, potassium ions from the cation source are exchanged for sodium ions within the glass during ion exchange by immersing the glass in a molten salt bath comprising a potassium salt such as, but not limited to, potassium nitrate ($KNO_3$). Other potassium salts that may be used in the ion exchange process include, but are not limited to, potassium chloride (KCl), potassium sulfate ($K_2SO_4$), combinations thereof, and the like.

Figure 2:
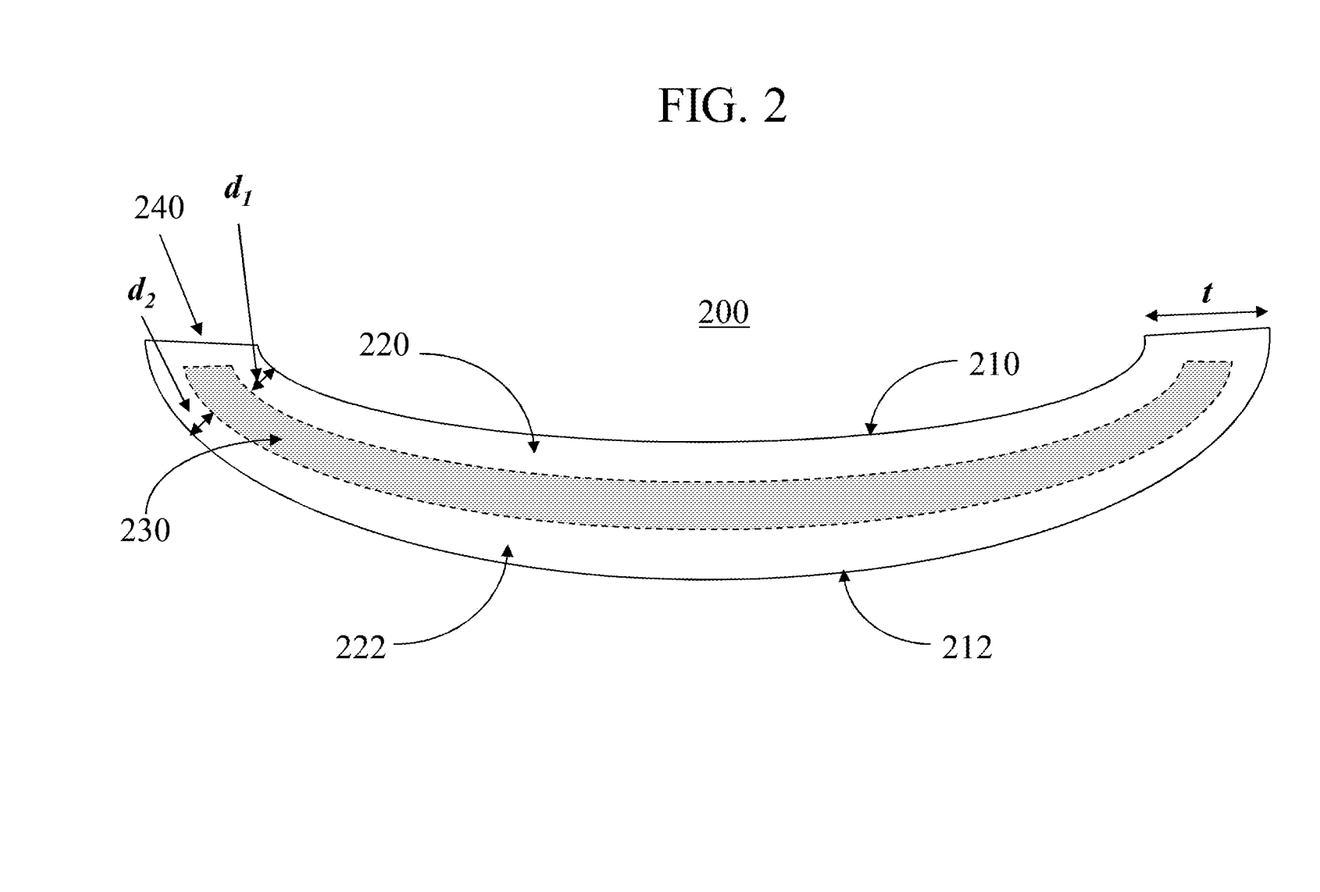
FIG. 2 is a cross-sectional schematic view of an ion exchanged three-dimensional glass article.

A cross-sectional schematic view of a curved, three-dimensional ion exchanged glass article is shown in FIG. 2. Three-dimensional glass article 200 has a thickness t, first surface 210, and second surface 212. Glass article 200 has a first compressive layer 220 extending from first surface 210 to a depth of layer $d_1$ into the bulk of the glass article 200. In the embodiment shown in FIG. 2, glass article 200 also has a second compressive layer 222 extending from second surface 212 to a second depth of layer $d_2$. Glass article also has a central region 230 that extends from $d_1$ to $d_2$. Central region 230 is under a tensile stress or central tension (CT), which balances or counteracts the compressive stresses of layers 220 and 222. The depth $d_1$, $d_2$ of first and second compressive layers 220, 222 protects the glass article 200 from the propagation of flaws introduced by sharp impact to first and second surfaces 210, 212 of glass article 200, while the compressive stress minimizes the likelihood of a flaw penetrating through the depth $d_1$, $d_2$ of first and second compressive layers 220, 222.

The glass articles described herein may be ion exchanged after being formed into a three-dimensional shape. In such instances, edges 240 joining first and second surfaces 210, 212 are ion exchanged as well, and have a surface layer under a compressive stress.

The ion exchange bath may comprise 100%, or nearly 100% (i.e., ≥99%) $KNO_3$ (or another potassium salt) by weight. In some embodiments, the ion exchange bath may comprise least about 95% $KNO_3$ by weight and, in other embodiments, at least about 92% $KNO_3$ by weight.

Unless otherwise specified, the glasses described herein are subjected to a single ion exchange process in which the glass is immersed an ion exchange bath comprising 100%, or nearly 100% $KNO_3$ (or another potassium salt) by weight. In some embodiments, however, the glass may undergo a two step—or dual—ion exchange in which the compositions of the first and second ion exchange baths differ from each other and, in some embodiments, the ion exchange bath temperatures and/or times also differ. In one non-limiting example, the glass is first ion exchanged a bath comprising salts of two different alkalis (e.g., $KNO_3$ and $NaNO_3$), followed by a second ion exchange in a bath comprising 100%, or nearly 100% $KNO_3$ (or another potassium salt) by weight. The effect of the first ion exchange bath is typically to achieve a deep depth of layer, whereas the second ion exchange bath is used to increase the compressive stress—i.e., provide a CS "spike"—at the surface of the glass.

In some embodiments, the glass is either annealed or undergoes a heat treatment prior to ion exchange. In some embodiments, this heat treatment is part of the 3D forming process used to shape the glass. The 3D forming process, in some embodiments, includes heating the glass on a mold to temperatures in the viscoelastic/viscous regime, applying a forming pressure using either vacuum or a complimentary mold to conform glass to mold, then cooling the glass on the mold to a lower temperature (e.g. to a temperature that is less than the annealing point+40° C.). The glass is then taken off mold and cooled to room temperature in ambient air. The 3D articles may have some stress, as the cooling rate may be higher than the recommended rate for annealing.

The annealing step is carried out by heating the glass to a predetermined temperature, typically the anneal point of the glass, but the temperature may also be about 30° C. less than the anneal point. The glass is held at this temperature for a predetermined time, and then cooled at prescribed rates to relieve stresses. The annealed glass is typically more compacted than the 3D formed glass.

In some embodiments, the glasses described herein have a compressive layer having a maximum compressive stress CS of at least about 600 MPa and a depth of layer DOL of at least about 40 μm when ion exchanged at 410° C. in a molten potassium nitrate bath for up to about 8 hours or, in some embodiments, 7 hours or less. In other embodiments, a maximum CS of at least about 700 MPa, or at least about 800 MPa, may be achieved under like ion exchange conditions. In some embodiments, a DOL of at least about 50 μm may be achieved after ion exchange at 410° C. for 10 hours in a molten potassium nitrate bath. In certain embodiments, a DOL of at least about 70 μm, or at least about 80 μm, may be achieved after ion exchange. The maximum compressive stress is, in some embodiments, located at the surface of the glass and compressive layer. Other ion exchange times, ranging up to about 24 hours, and temperatures, ranging from about 370° C. up to about 480° C., may be used to achieve similar results for these glasses. Non-limiting examples of such conditions are listed in Table 3.

Table 3 lists results of ion exchange experiments performed on the glasses described herein and the stress optical coefficient (SOC) determined for each sample. Prior to ion exchange, each 1 mm thick sample was either annealed at the annealing point of that particular glass composition for 2 hours followed by slow cooling to room temperature, or fictivated/heated at the $10^{11}$ Poise temperature ("fictive temperature" in Table 2) for 4 minutes followed by quenching in air to room temperature. The glasses were then ion exchanged in a single, pure $KNO_3$ bath at 420° C. for either 4 or 8 hours.

TABLE 3

Conditions used in ion exchange experiments and CS and DOL values obtained for 1 mm thick samples of the glasses listed in Table 1.

| | Sample | | | | | |
|---|---|---|---|---|---|---|
| | 1 | 2 | 3 | 4 | 5 | 6 |
| SOC (nm/MPa/mm): | 3.136 | 3.12 | 3.069 | 3.048 | 3.203 | 3.076 |
| | 420° C./4 h/1 mm/Annealed | | | | | |
| CS (MPa) | 1012.8 | 856.5 | 870.4 | 883.0 | 987.1 | 870.9 |
| DOL (μm) | 46.9 | 68.5 | 61.1 | 61.0 | 50.3 | 54.3 |
| | 420° C./4 h/1 mm/Fictivated | | | | | |
| CS (MPa) | 956.8 | 878.3 | 818.9 | 817.1 | 944.9 | 799.1 |
| DOL (μm): | 65.5 | 76.0 | 93.0 | 84.8 | 69.9 | 75.8 |
| | 420° C./4 h/1 mm/Fictivated | | | | | |
| CS (MPa) | 847.0 | 802.2 | 749.1 | 769.9 | 859.1 | 691.2 |
| DOL (μm) | 57.1 | 65.7 | 79.9 | 72.3 | 62.5 | 64.6 |
| | 420° C./8 h/1 mm/Fictivated | | | | | |
| CS (MPa) | 793.7 | 736.7 | 683.5 | 708.2 | 611.6 | 638.8 |
| DOL (μm) | 79.6 | 90.3 | 109.2 | 99.9 | 90.2 | 89.5 |

| | Sample | | | | | |
|---|---|---|---|---|---|---|
| | 7 | 8 | 9 | 10 | 11 | 12 |
| SOC (nm/MPa/mm) | 3.125 | 3.105 | 3.085 | 2.997 | 3.043 | 2.973 |
| | 420° C./4 h/1 mm/Annealed | | | | | |
| CS (MPa) | 951.9 | 922.1 | 875.6 | 713.1 | 678.1 | 674.3 |
| DOL (μm) | 47.1 | 54.7 | 64.9 | 52.6 | 58.6 | 58.3 |
| | 420° C./4 h/1 mm/Annealed | | | | | |
| CS (MPa) | 894.1 | 848.1 | 812.8 | 638.1 | 602.7 | 606.0 |
| DOL (μm): | 65.1 | 77.4 | 88.1 | 76.4 | 81.8 | 81.8 |
| | 420° C./4 h/1 mm/Fictivated | | | | | |
| CS (MPa) | 808.2 | 758.0 | 749.4 | 546.7 | 543.8 | 560.2 |
| DOL (μm) | 53.6 | 64.3 | 76.0 | 63.5 | 68.5 | 66.9 |
| | 420° C./8 h/1 mm/Fictivated | | | | | |
| CS (MPa) | 733.5 | 706.6 | 690.0 | 513.4 | 479.7 | 477.5 |
| DOL (μm) | 74.9 | 91.3 | 103.9 | 85.3 | 95.6 | 94.4 |

The glasses described herein, in either planar or three-dimensional configurations, may form at least a portion of a cover glass or housing of consumer electronic product such as phones, notebooks, entertainment devices, and the like such products typically comprise: a housing having front, back, and side surfaces; electrical components that are at least partially internal to the housing and including at least a controller, a memory, and a display at or adjacent to the front surface of the housing; and a cover glass at or over the front surface of the housing such that it is over the display. The cover glass and/or housing has a thickness of from about 0.25 mm, or from about 0.5 mm, to about 1.0 mm, or to about 2.5 mm, and may, in some embodiments, be strengthened by ion exchange.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. An alkali aluminosilicate glass, the alkali aluminosilicate glass comprising: from 0 mol % to about 1 mol % $B_2O_3$, from 1 mol % to about 8 mol % ZnO, and from 18 mol % to about 22 mol % $Na_2O$, the alkali aluminosilicate glass having a softening point of 860° C. or less, wherein 1.3≤$R_2O$ (mol %)/$Al_2O_3$(mol %)≤2.2, where $R_2O$=($Li_2O$(mol %)+$Na_2O$(mol %)+$K_2O$(mol %)+$Rb_2O$(mol %)+$Cs_2O$(mol %)).

2. The alkali aluminosilicate glass of claim 1, wherein the alkali aluminosilicate glass is boron-free.

3. The alkali aluminosilicate glass of claim 1, wherein 5 mol %≤$R_2O$(mol %)−$Al_2O_3$(mol %)≤12 mol %.

4. The alkali aluminosilicate glass of claim 3, wherein 5 mol %≤$Na_2O$(mol %)+$K_2O$(mol %)−$Al_2O_3$(mol %)≤12 mol %.

5. The alkali aluminosilicate glass of claim 1, wherein the alkali aluminosilicate glass comprises: from about 50 mol % to about 70 mol % $SiO_2$; from about 10 mol % to about 15 mol % $Al_2O_3$; from 0 mol % to about 1 mol % $B_2O_3$; from 0 mol % to about 5 mol % $P_2O_5$; from 18 mol % to about 22 mol % $Na_2O$; from 0 mol % to about 3 mol % $K_2O$; from 0 mol % to about 4 mol % MgO; from 0 mol % to about 1 mol % CaO; and from 1 mol % to about 8 mol % ZnO.

6. The alkali aluminosilicate glass of claim 5, wherein the alkali aluminosilicate glass comprises: from about 55 mol % to about 66 mol % $SiO_2$; from about 10 mol % to about 14 mol % $Al_2O_3$; from 0 mol % to about 0.5 mol % $B_2O_3$; from 0 mol % to about 5 mol % $P_2O_5$; from about 19 mol % to about 21 mol % $Na_2O$; from 0 mol % to about 2 mol % $K_2O$; from 0 mol % to about 2 mol % MgO; from 0 mol % to about 0.5 mol % CaO; and from 1 mol % to about 7 mol % ZnO.

7. The alkali aluminosilicate glass of claim 6, wherein 5 mol %≤$Na_2O$(mol %)+$K_2O$(mol %)−$Al_2O_3$(mol %)≤10 mol %.

8. The alkali aluminosilicate glass of claim 6, wherein $K_2O$(mol %)≤0.5($Na_2O$(mol %)+$K_2O$(mol %)).

9. The alkali aluminosilicate glass of claim 6, wherein 1.3≤($Na_2O$(mol %)+$K_2O$(mol %))/$Al_2O_3$(mol %)≤2.0.

10. The alkali aluminosilicate glass of claim 6, wherein the alkali aluminosilicate glass comprises: from about 56 mol % to about 62 mol % $SiO_2$; from about 11 mol % to about 14 mol % $Al_2O_3$; from about 1 mol % to about 5 mol % $P_2O_5$; from about 19 mol % to about 20 mol % $Na_2O$; from 0 mol % to about 2 mol % $K_2O$; from 0 mol % to about 4 mol % MgO; from 0 mol % to about 0.2 mol % CaO; and from about 2 mol % to about 7 mol % ZnO, wherein 5 mol %≤$Na_2O$(mol %)+$K_2O$(mol %)−$Al_2O_3$(mol %)≤9 mol %.

11. The alkali aluminosilicate glass of claim 10, wherein 1.4≤($Na_2O$(mol %)+$K_2O$(mol %))/$Al_2O_3$(mol %)≤1.8.

12. The alkali aluminosilicate glass of claim 1, wherein the alkali aluminosilicate glass is ion exchanged and has a compressive layer extending to a depth of layer of at least about 40 µm from at least one surface of the alkali aluminosilicate glass into the alkali aluminosilicate glass and having a maximum compressive stress of at least about 600 MPa.

13. The alkali aluminosilicate glass of claim 12, wherein the alkali aluminosilicate glass is ion exchanged for seven hours or less in a single ion exchange bath.

14. The alkali aluminosilicate glass of claim 13, wherein, after being ion exchanged in the first ion exchange bath, the first ion exchange bath having a first composition, the alkali aluminosilicate glass is ion exchanged in a second ion exchange bath, the second ion exchange bath having a second composition that is different from the first composition.

15. The alkali aluminosilicate glass of claim 14, wherein the maximum compressive stress is at least about 600 MPa after the alkali aluminosilicate glass is ion exchanged in the second ion exchange bath.

16. The alkali aluminosilicate glass of claim 1, wherein the alkali aluminosilicate glass comprises at least a portion of a cover glass or a housing of a consumer electronic product.

17. The alkali aluminosilicate glass of claim 16, wherein at least one of the cover glass and the housing has a thickness from about 0.25 mm to about 1.0 mm.

18. The alkali aluminosilicate glass of claim 1, wherein the alkali aluminosilicate glass is formable into a three-dimensional non-planar article.

19. A consumer electronic product, comprising: a housing having front, back, and side surfaces; electrical components that are at least partially internal to the housing and including at least a controller, a memory, and a display at or adjacent to the front surface of the housing; and a cover glass at or over the front surface of the housing such that it is over the display,
wherein at least a portion of at least one of the housing and the cover glass includes the glass of claim 1.

20. An alkali aluminosilicate glass comprising: from about 50 mol % to about 70 mol % $SiO_2$; from about 10 mol % to about 15 mol % $Al_2O_3$; from 0 mol % to about 1 mol % $B_2O_3$; from 0 mol % to about 5 mol % $P_2O_5$; from 18 mol % to about 22 mol % $Na_2O$; from 0 mol % to about 3 mol % $K_2O$; from 0 mol % to about 4 mol % MgO; from 0 mol % to about 1 mol % CaO; and from 1 mol % to about 8 mol % ZnO, wherein $1.3 \leq (Na_2O(\text{mol }\%) + K_2O(\text{mol }\%))/Al_2O_3(\text{mol }\%) \leq 2.0$, wherein the alkali aluminosilicate glass has a softening point of 860° C. or less, and wherein $1.3 \leq R_2O(\text{mol }\%)/Al_2O_3(\text{mol }\%) \leq 2.2$, where $R_2O = (Li_2O(\text{mol }\%) + Na_2O(\text{mol }\%) + K_2O(\text{mol }\%) + Rb_2O(\text{mol }\%) + Cs_2O(\text{mol }\%))$.

21. The alkali aluminosilicate glass of claim 20, wherein the alkali aluminosilicate glass is boron-free.

22. The alkali aluminosilicate glass of claim 20, wherein $5 \text{ mol }\% \leq R_2O(\text{mol }\%) - Al_2O_3(\text{mol }\%) \leq 12 \text{ mol }\%$.

23. The alkali aluminosilicate glass of claim 20, wherein the alkali aluminosilicate glass comprises: from about 55 mol % to about 66 mol % $SiO_2$; from about 10 mol % to about 14 mol % $Al_2O_3$; from 0 mol % to about 0.5 mol % $B_2O_3$; from 0 mol % to about 5 mol % $P_2O_5$; from about 19 mol % to about 21 mol % $Na_2O$; from 0 mol % to about 2 mol % $K_2O$; from 0 mol % to about 2 mol % MgO; from 0 mol % to about 0.5 mol % CaO; and from 1 mol % to about 7 mol % ZnO, wherein the alkali aluminosilicate glass has a softening point of 860° C. or less.

24. The alkali aluminosilicate glass of claim 20, wherein $5 \text{ mol }\% \leq Na_2O(\text{mol }\%) + K_2O(\text{mol }\%) - Al_2O_3(\text{mol }\%) \leq 10 \text{ mol }\%$.

25. The alkali aluminosilicate glass of claim 20, wherein $K_2O(\text{mol }\%) \leq 0.5(Na_2O(\text{mol }\%) + K_2O(\text{mol }\%))$.

26. The alkali aluminosilicate glass of claim 20, wherein $1.3 \leq (Na_2O(\text{mol }\%) + K_2O(\text{mol }\%))/Al_2O_3(\text{mol }\%) \leq 2.0$.

27. The alkali aluminosilicate glass of claim 20, wherein the alkali aluminosilicate glass comprises: from about 56 mol % to about 62 mol % $SiO_2$; from about 11 mol % to about 14 mol % $Al_2O_3$; from about 1 mol % to about 5 mol % $P_2O_5$; from about 19 mol % to about 20 mol % $Na_2O$; from 0 mol % to about 2 mol % $K_2O$; from 0 mol % to about 4 mol % MgO; from 0 mol % to about 0.2 mol % CaO; and from about 2 mol % to about 7 mol % ZnO, wherein $5 \text{ mol }\% \leq Na_2O(\text{mol }\%) + K_2O(\text{mol }\%) - Al_2O_3(\text{mol }\%) \leq 9 \text{ mol }\%$.

28. The alkali aluminosilicate glass of claim 27, wherein $1.4 \leq (Na_2O(\text{mol }\%) + K_2O(\text{mol }\%))/Al_2O_3(\text{mol }\%) \leq 1.8$.

29. The alkali aluminosilicate glass of claim 20, wherein the alkali aluminosilicate glass is ion exchanged and has a compressive layer extending to a depth of layer of at least about 40 µm from at least one surface of the alkali aluminosilicate glass into the alkali aluminosilicate glass and having a maximum compressive stress of at least about 600 MPa.

30. The alkali aluminosilicate glass of claim 29, wherein the alkali aluminosilicate glass is ion exchanged for seven hours or less in a single ion exchange bath.

31. The alkali aluminosilicate glass of claim 29, wherein, after being ion exchanged in the first ion exchange bath, the first ion exchange bath having a first composition, the alkali aluminosilicate glass is ion exchanged in a second ion exchange bath, wherein the second ion exchange bath having a second composition that is different from the first composition.

32. The alkali aluminosilicate glass of claim 31, wherein the maximum compressive stress is at least about 600 MPa after the alkali aluminosilicate glass is ion exchanged in the second ion exchange bath.

33. The alkali aluminosilicate glass of claim 20, wherein the alkali aluminosilicate glass comprises at least a portion of a cover glass or a housing of a consumer electronic product.

34. The alkali aluminosilicate glass of claim 20, wherein at least one of the cover glass and the housing has a thickness from about 0.25 mm to about 1.0 mm.

35. The alkali aluminosilicate glass of claim 20, wherein the alkali aluminosilicate glass is formable into a three-dimensional non-planar article.

36. A consumer electronic product, comprising: a housing having front, back, and side surfaces; electrical components that are at least partially internal to the housing and including at least a controller, a memory, and a display at or adjacent to the front surface of the housing; and a cover glass at or over the front surface of the housing such that it is over the display,
wherein at least a portion of at least one of the housing and the cover glass includes the glass of claim 20.

* * * * *